US009350755B1

(12) United States Patent
Glick et al.

(10) Patent No.: US 9,350,755 B1
(45) Date of Patent: May 24, 2016

(54) METHOD AND APPARATUS FOR DETECTING MALICIOUS SOFTWARE TRANSMISSION THROUGH A WEB PORTAL

(75) Inventors: Adam Lyle Glick, Culver City, CA (US); Spencer Dale Smith, El Segundo, CA (US); Nicholas Robert Graf, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 866 days.

(21) Appl. No.: 12/407,905

(22) Filed: Mar. 20, 2009

(51) Int. Cl.
*H04L 29/06* (2006.01)

(52) U.S. Cl.
CPC .................................. *H04L 63/145* (2013.01)

(58) Field of Classification Search
USPC ............................................................ 726/25
See application file for complete search history.

(56) References Cited

U.S. PATENT DOCUMENTS

| 7,281,269 | B1 * | 10/2007 | Sievers | H04L 12/585 |
| | | | | 713/161 |
| 7,340,776 | B2 * | 3/2008 | Zobel | G06F 21/577 |
| | | | | 713/188 |
| 7,398,399 | B2 * | 7/2008 | Palliyil | G06F 21/56 |
| | | | | 713/187 |
| 7,496,960 | B1 * | 2/2009 | Chen | G06F 21/56 |
| | | | | 726/22 |
| 7,941,851 | B2 * | 5/2011 | Shahar | G06F 21/552 |
| | | | | 713/188 |
| 8,800,040 | B1 * | 8/2014 | Tan | H04L 63/1408 |
| | | | | 709/224 |
| 2002/0104014 | A1 * | 8/2002 | Zobel et al. | 713/200 |
| 2005/0015599 | A1 * | 1/2005 | Wang et al. | 713/176 |
| 2006/0037079 | A1 * | 2/2006 | Midgley | 726/24 |
| 2007/0022116 | A1 * | 1/2007 | Smith | 707/7 |
| 2007/0079379 | A1 * | 4/2007 | Sprosts et al. | 726/24 |
| 2007/0192861 | A1 * | 8/2007 | Varghese | H04L 63/145 |
| | | | | 726/23 |
| 2008/0010310 | A1 * | 1/2008 | Sprowls | G06F 21/568 |
| 2008/0141375 | A1 * | 6/2008 | Amundsen | 726/24 |
| 2008/0229419 | A1 * | 9/2008 | Holostov | G06F 21/564 |
| | | | | 726/24 |
| 2009/0222923 | A1 * | 9/2009 | Dixon | G06F 21/563 |
| | | | | 726/24 |

FOREIGN PATENT DOCUMENTS

WO    WO 2007071999 A1 *  6/2007

OTHER PUBLICATIONS

Alazab, Mamoun, et al. "Cybercrime: the case of obfuscated malware." Global Security, Safety and Sustainability & e-Democracy. Springer Berlin Heidelberg, 2012. 204-211.*

Lawrence, Eric, "Implementing IOfficeAntiVirus interface in C#," Nov. 14, 2007, © 2009 Eric Lawrence, downloaded from web site http://www.enhanceie.com/ie/IOfficeAntiVirusInCSharp.asp on May 27, 2009.

"IOfficeAntiVirus Interface," Microsoft Developer Network, © 2009 Microsoft Corporation, downloaded from web site http://msdn.microsoft.com/en-us/library/ms537369.aspx on May 27, 2009.

* cited by examiner

*Primary Examiner* — Harris C Wang
(74) *Attorney, Agent, or Firm* — Wilmer Cutler Pickering Hale and Dorr LLP

(57) ABSTRACT

A method and apparatus for detecting malware transmission through a web portal is provided. In one embodiment, a method for detecting malicious software transmission through the web portal comprises accessing a security scan history that comprises information regarding a plurality of executables that are scanned upon executable creation and comparing current executable creation activity with the security scan history to identify at least one executable that is not scanned.

15 Claims, 3 Drawing Sheets

METHOD AND APPARATUS FOR DETECTING MALICIOUS SOFTWARE TRANSMISSION THROUGH A WEB PORTAL

BACKGROUND

1. Field of the Invention

Embodiments of the present invention generally relate to computer security systems and, more particularly, to a method and apparatus for detecting malicious software transmission through a web portal.

2. Description of the Related Art

Widespread use of the Internet by small to large organization results in an increase in computer system attacks by various malicious software programs (e.g., viruses, Trojan horses, worms and/or the like). Such malicious software programs may be transmitted (e.g., through drive by download) to the computer system, without a user's consent and/or knowledge, as an executable program, as an email attachment, as malicious HTML code on a web page and/or the like.

Generally, the malicious software programs identify and target a vulnerability associated with a web portal (i.e., a web browser), a mail server, an operating system and/or the like, to access the computer system. For example, the user may utilize the web portal (e.g., an Internet Explorer, a Firefox and/or the like) to access various websites. As such, a particular malicious software program may identify and exploit the vulnerability of the web portal to exert control over the computer system. Subsequently, the malicious software programs is executed on the computer system, without the user's knowledge, in order to damage expensive computer hardware, destroy valuable data, consume limited computing resources and/or compromise sensitive information. Consequently, security of the computer system is compromised.

Currently, various security software programs (e.g., antivirus, anti-spyware, anti-phishing software programs) are employed to detect the malicious software programs and prevent problems caused by the execution of such malicious software programs. The various security software programs may monitor a computer system for activities and/or code signatures associated with the malicious software programs and provide various remedial measures, such as quarantining, repairing or deleting infected files. However, the security software programs require a prior knowledge of known vulnerabilities, internal architecture of the web portals and the signatures of the known vulnerabilities. As a result, the security software programs protect the computer system only from known vulnerabilities and hence, fail to protect against unknown vulnerabilities.

Therefore, there is a need in the art for a method and apparatus for detecting malicious software transmission through a web portal.

SUMMARY OF THE INVENTION

Embodiments of the present invention comprise a method and apparatus for detecting malware transmission through a web portal. In one embodiment, a method for detecting malicious software transmission through a web portal comprises accessing a security scan history that comprises information regarding a plurality of executables that are scanned upon executable creation and comparing current executable creation activity with the security scan history to identify at least one executable that is not scanned.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
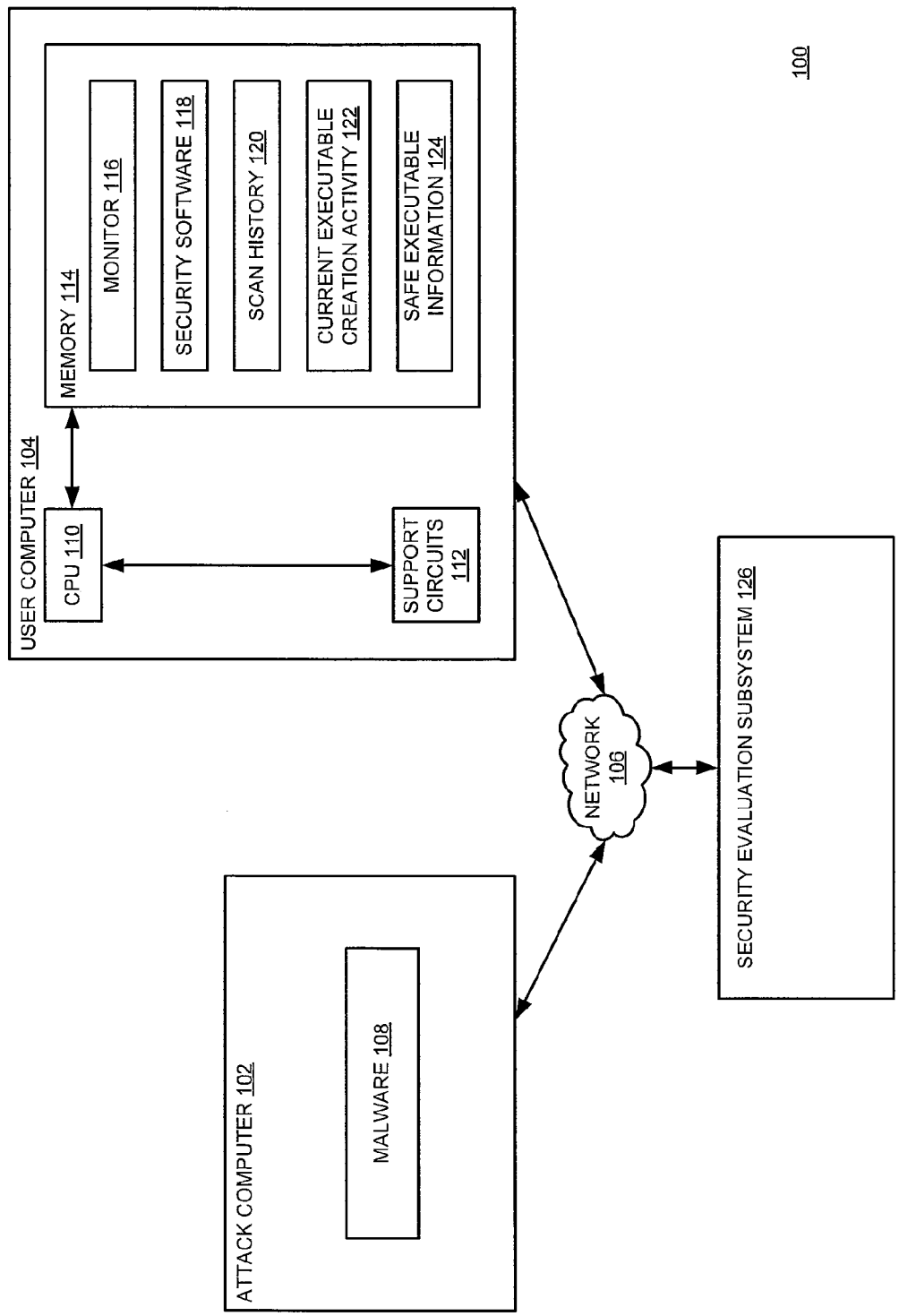
FIG. 1 is a block diagram of a system for detecting malicious software transmission through a web portal according to various embodiments.

FIG. 1 is a block diagram of a system 100 for detecting malicious software transmission through a web portal according to one embodiment. The system 100 comprises an attack computer 102, a user computer 104 and a security evaluation subsystem 126, where each is coupled to each other through a network 106.

The user computer 104 is a type of computing device (e.g., a laptop, a desktop, a Personal Digital Assistant (PDA) and/or the like), such as those generally known in the art. The user computer 104 includes a Central Processing Unit (CPU) 110, various support circuits 112 and a memory 114. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits, and/or the like. The memory 114 comprises at least one of Read Only Memory (ROM), Random Access Memory (RAM), disk drive storage, optical storage, removable storage and/or the like. The memory 114 includes various data, such as a scan history 120, a current executable creation activity 122, and safe executable information 124. The memory 114 further includes various software packages, such as a monitor 116 and security software 118.

The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the Internet or Intranet using various communications infrastructure, such as Ethernet, WiFi, WiMax, General Packet Radio Service (GPRS), and the like.

The attack computer 102 is a type of computing device (e.g., a laptop, a desktop, a Personal Digital Assistant (PDA) and/or the like), such as those generally known in the art. The attack computer 102 includes malware 108 (e.g., malicious software programs such as spyware, viruses, rootkits and/or the like). Generally, the attack computer 102 may be utilized by a hacker with an intention to upload the malware 108 onto the user computer 104 and compromise computer security (e.g., disrupt critical operations and/or misappropriate passwords, credit card details and/or the like).

Generally, the malware 108 includes software code that when executed, causes degradation and disruption to stability and performance of the user computer 104. Once the malware 108 realizes control over the user computer 104, the malware 108 may compromise sensitive data, such as personal information or online credentials (e.g., a login name, a password, social security number, credit card details and the like). In one or more embodiments, the malware 108 may access the user computer 104 through various channels, such as an executable (e.g., file), an email attachment, as malicious HTML code on a web page and/or the like. For example, a user may accidently download the malware 108 while browsing a malicious website.

According to various embodiments, the CPU 110 executes the security software 118 stored in the memory 114 to perform a security scan on computer data that is stored within the user computer 104. In one embodiment, the security software 118 scans various computer resources (e.g., local storage devices, computer memory and/or the like) in order to detect the malware 108 and mitigates any detrimental effect caused by execution. The security software 118 may scan the user computer 104 after a fixed time interval, a pre-defined time interval or a variable time interval. As shown below, the security software 118 scans one or more executables that are transmitted through a web portal.

Generally, the monitor 116 includes software code that is configured to detect an executable creation that deviated from a normal workflow. For example, Internet Explorer code files (e.g., ActiveX controls, patch installs and/or the like) are normally scanned for malicious software programs before downloading. Therefore, any Internet Explorer code file (e.g., the malware 108) that circumvents a security scan is most likely malicious. As described below, the monitor 116 identifies one or more executables that are transmitted to the user computer 104, but not scanned for malicious software programs.

The CPU 110 executes the monitor 116 stored in the memory 114 to monitor the one or more applications (e.g., a web portal (e.g., Internet Explorer (IE), Firefox, and/or the like)) through which one or more executables are created. For example, the monitor 116 may be a hook that intercepts each executable creation request initiated by the one or more applications. As another example, the monitor 116 may be a driver that is configured to process such executable creation requests. Furthermore, the monitor 116 may register a COM (Component Object Model) object that receives notifications associated with the one or more executables on which a security scan is performed.

In one embodiment, the scan history 120 includes information regarding one or more executables that are transmitted to the user computer 104 and then, scanned for malicious software program. For example, the scan history 120 may include from notifications associated with one or more security scans performed on the one or more executables upon executable creation. As described herein, an object (e.g., a component that implements an antivirus interface, such as IOfficeAntiVirus) may be instantiated to process such notifications and generate the scan history 120. Accordingly, any executable that is scanned is reflected in the scan history 120.

The monitor 116 includes software code that is designed to generate the current executable creation activity 122. According to various embodiments, the current executable creation activity 122 may be a list of one or more executables created by the user computer 104 and/or transmitted through the web portal. For example, the current executable creation activity 122 includes one or more executable creation requests that are initiated through the web portal.

In operation, the monitor 116 compares the current executable creation activity 122 with the scan history 120 in order to identify one or more executables that are not scanned for malicious software. Accordingly, the monitor 116 instructs the security software 118 to perform a security scan on the one or more unscanned executables in order to detect the malware 108. Subsequently, the monitor 116 prevents the creation of the one or more unscanned executables. For example, the monitor 116 terminates the transmission of the one or more unscanned executables. If the one or more unscanned executables are already downloaded, the monitor 116 deletes the one or more unscanned executables. Furthermore, the monitor 116 blocks process (e.g., operating system process) creation that may be associated with the one or more unscanned executables. Alternatively, the monitor 116 communicates information associated with the one or more unscanned executables to the security evaluation subsystem 126 for analysis as described below.

In one or more embodiments, the monitor 116 examines the safe executable information 124 to identify one or more false positives amongst the one or more unscanned executables. In one embodiment, the safe executable information 124 maintains records of one or more executables (e.g., ActiveX controls and/or the like) that are safe to download on the user computer 104. Furthermore, the safe executable information 124 (i.e., a white list) indicates one or more internet resources (e.g., domain names, Uniform Resource Locators (URL) and/or the like) that are safe for browsing and free of malicious software programs. As described below, the safe executable information 124 is updated with information regarding each unscanned executable of the one or more unscanned executables that is discovered to be a false positive.

According to various embodiments, the security evaluation subsystem 126 examines one or more unscanned executables to produce a security evaluation result, which is communicated to the user computer 104. The security evaluation subsystem 126 analyzes the one or more unscanned executables to determine whether execution of a particular unscanned executable is safe. For example, if the particular unscanned executable exploits various vulnerabilities in the operating system or the web portal, then the particular unscanned executable is most likely unsafe. Hence, the security evaluation result indicates that the monitor 116 accurately detected an attack on the user computer 104 if the particular unscanned executable includes malicious software code. On the other hand, if the particular unscanned executable does not include malicious software code, then the security evaluation result indicates a false positive. Accordingly, the monitor 116 processes the security evaluation result and updates the safe executable information 124.

For example, the particular unscanned executable may include a digital signature from a trusted provider. As such, the digital signature as well as a source URL may be examined to verify the trusted provider. If the trusted provider is verified and the digital signature is valid, then the particular unscanned executable is most likely a false positive. If the trusted provider cannot be verified and/or the digital signature is not valid, then the security software 118 accurately detected a malicious software program. Hence, the particular unscanned executable is most likely unsafe.

As another example, the security evaluation subsystem may include reputation information in which the particular unscanned executable is mapped to a certain prevalence value. In other words, if a significant number of computers safely downloaded the particular unscanned executable, then the particular unscanned executable is mostly likely a false positive. On the other hand, the particular unscanned executable may have caused damaged on several computers. Due to such a bad reputation, the particular unscanned executable is most likely unsafe. Hence, the security software 118 accurately detected an attack on the computer from a malicious software program.

Figure 2:
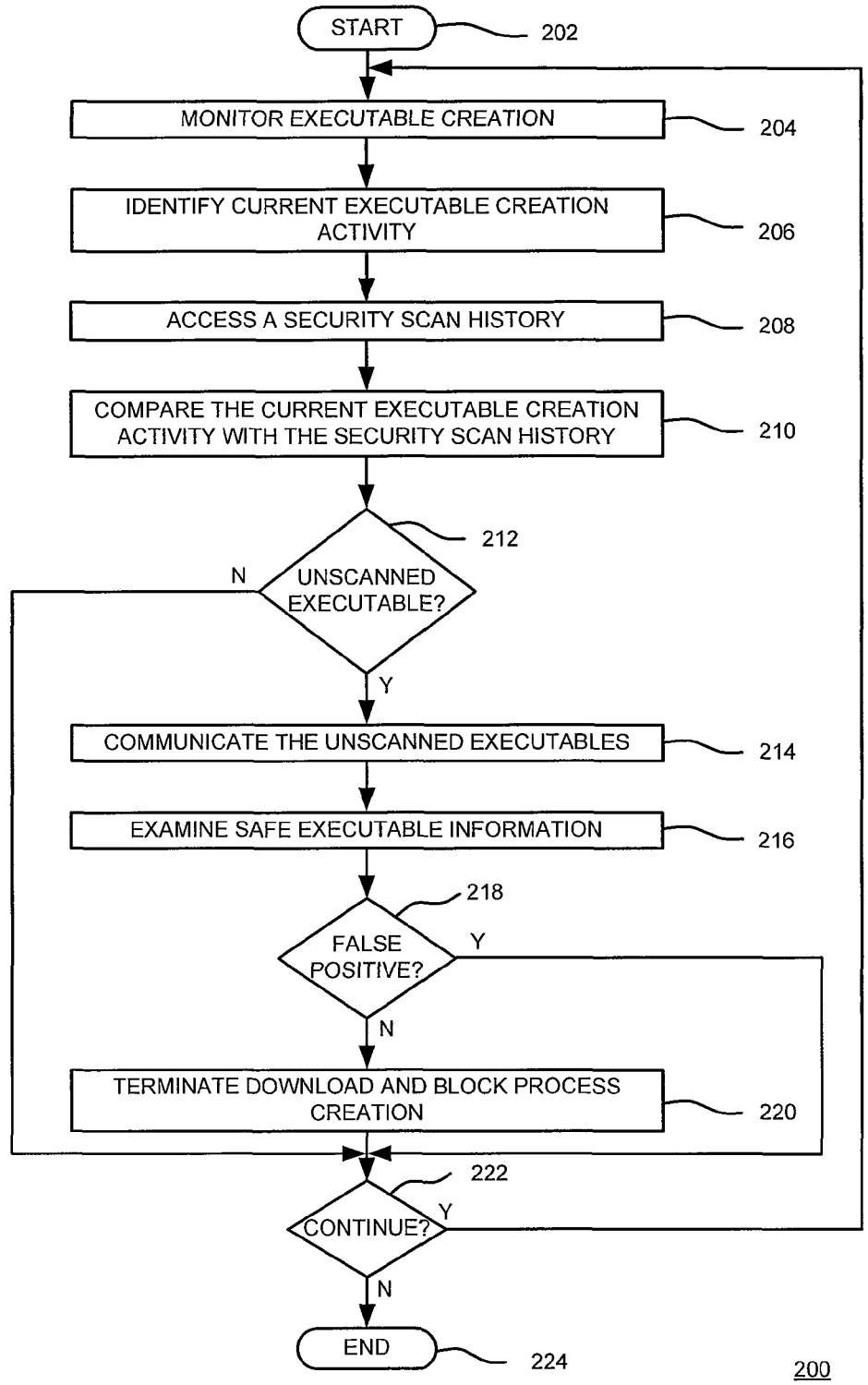
FIG. 2 is a flow diagram of a method for detecting malicious software transmission through a web portal according to various embodiments.

FIG. 2 is a flow diagram of a method 200 for detecting malicious software transmission through a web portal according to one embodiment. The method 200 starts at step 202 and proceeds to step 204, at which executable creation is monitored. At step 206, a current executable creation activity (e.g., the current executable creation activity 122 of FIG. 1) is identified. At step 208, a scan history (e.g., the scan history 120 of FIG. 1) is accessed. At step 210, the current executable creation activity is compared with the security scan history.

At step 212, a determination is made as to whether one or more executables are not scanned. In one or more embodiments, a monitor (e.g., the monitor 116 of FIG. 1) examines the current executable creation activity to determine if each and every executable is scanned by security software (e.g., the security software 118 of FIG. 1). If it is determined that each and every executable is scanned (option "NO"), then the method 200 proceeds to step 222. If, at step 212, it is determined that one or more executables are not scanned (option "YES"), then the method 200 proceeds to step 214.

At step 214, the unscanned executables are communicated. In one embodiment, the unscanned executables are communicated to a security evaluation subsystem (e.g., the security evaluation subsystem 126 of FIG. 1) for further analysis. At step 216, safe executable information (e.g., the safe executable information 124 of FIG. 1) is examined. In one embodiment, the safe executable information is compared to the unscanned executables to identify one or more false positives. At step 218, a determination is made as to whether there is a false positive. If it is determined that there is a false positive (option "YES"), then the method 200 proceeds to step 222.

If, at step 218, it is determined that there are no false positives (option "NO"), then the method 200 proceeds to step 220. At step 220, download of the unscanned executables is terminated and process creation based on the unscanned executables is blocked. The method 200 proceeds to step 222. At step 222, a determination is made as to whether the executable creation is to continue to be monitored. If it is determined that the monitoring of the executable creation is to continue (option "YES"), then the method 200 proceeds to step 204. If, at step 222, it is determined that the executable creation to not to be monitored (option "NO"), then the method 200 proceeds to step 224. At step 224, the method 200 ends.

Figure 3:
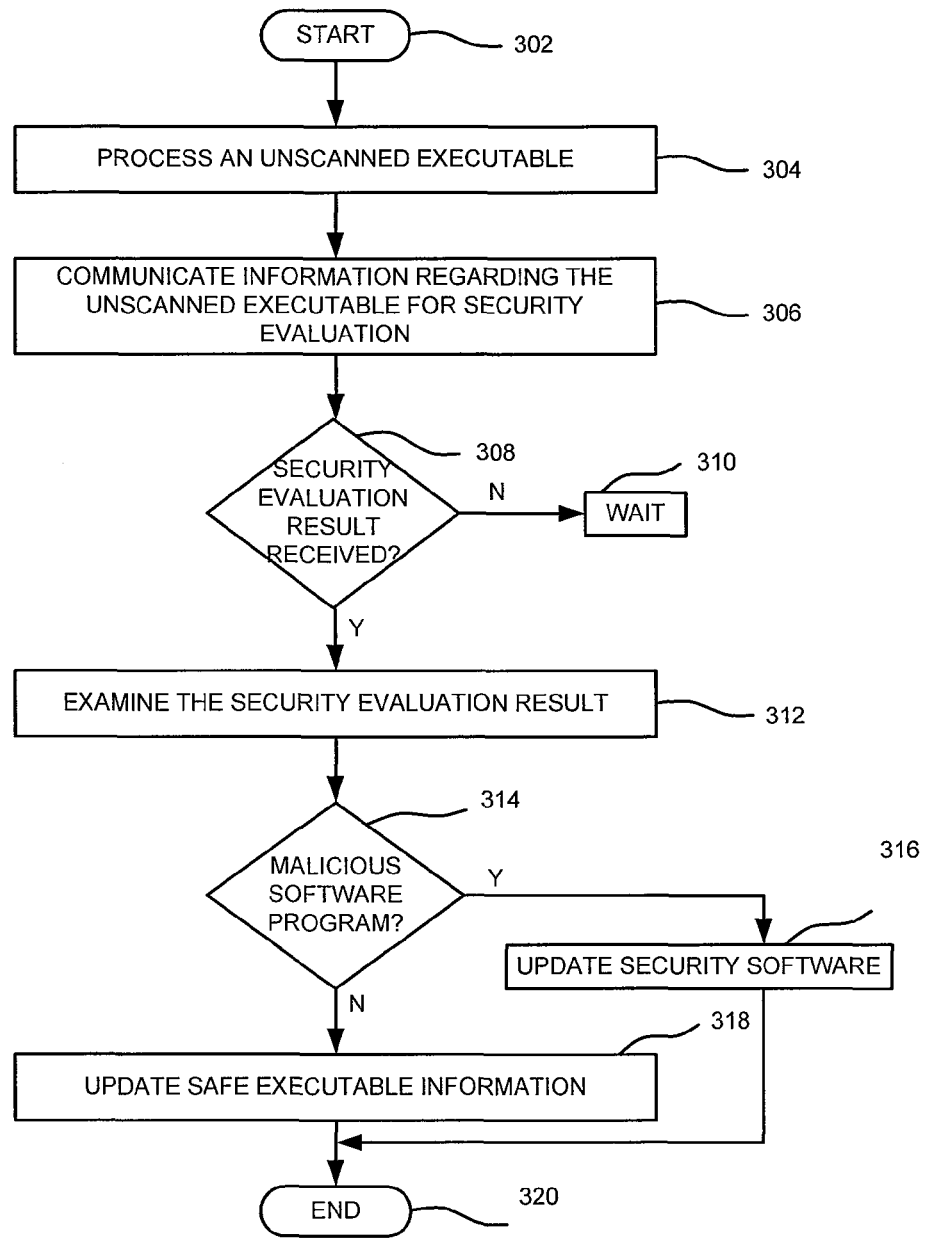
FIG. 3 is a flow diagram of a method for mitigating a false positive according to various embodiments.

FIG. 3 is a flow diagram of a method 300 for mitigating a false positive according to one embodiment. The method 300 starts at step 302 and proceeds to step 304, at which an unscanned executable is processed. At step 306, information regarding the unscanned executable is communicated for a security evaluation. At step 308, a determination is made as to whether a security evaluation result is received. If it is determined that no result is received (option "NO") then the method 300 proceeds to step 310. At step 310, the method 300 waits. In one embodiment, the method 300 waits until the security evaluation result is received.

If, at step 308, it is determined that the security evaluation result is received (option "YES") then the method 300 proceeds to step 312. At step 312, the security evaluation result is examined. At step 314, a determination is made as to whether the security evaluation result indicates that the unscanned executable is a malicious software program. If it is determined that the unscanned executable is a malicious software program (option "YES") then the method 300 proceeds to step 316. At step 316, the security software (e.g., the security software 118 of FIG. 1) is updated. The method 300 proceeds to step 320.

If, at step 314, it is determined that the unscanned executable is not a malicious software program (option "NO"), then the method 300 proceeds to step 318. At step 318, safe executable information (e.g., the safe executable information 124 of FIG. 1) is updated. The method 300 proceeds to step 320, at which the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for detecting malicious software transmission through a web portal, comprising:
    monitoring, via at least one computer processor, the web portal via a scan operation configured to scan software transmissions for a plurality of known malicious programs;
    accessing a security scan history that comprises information regarding a plurality of software transmissions transmitted through the web portal and were scanned by the scan operation upon transmission;
    accessing a current executable file creation activity that comprises information regarding a new software transmission transmitted through the web portal;
    comparing the current executable file creation activity with the security scan history to detect a bypass of the scan operation by the new software transmission, wherein the new software transmission had exploited a vulnerability of the web portal to bypass the scan operation upon transmission; and
    preventing creation of a new executable file from the new software transmission after detecting the bypass.

2. The method of claim 1, wherein accessing the security scan history further comprises establishing an object to process notifications associated with at least one security scan and generate the security scan history.

3. The method of claim 1, wherein comparing the current executable creation activity further comprises monitoring the executable file creation activity from the web portal to identify the current executable creation activity.

4. The method of claim 3, wherein comparing the current executable file creation activity further comprises processing a plurality of executable file creation requests from a plurality of applications, and wherein the web portal is an application of the plurality of applications.

5. The method of claim 1 further comprising communicating information regarding the new software transmission for a computer security evaluation.

6. The method of claim 5 further comprising:
    processing a computer security evaluation result that indicates at least one false positive for the new software transmission; and
    updating safe executable information with the at least one false positive.

7. The method of claim 1 further comprising examining safe executable information using the new software transmission to identify at least one false positive.

8. The method of claim 1 further comprising instructing security software to perform a security scan on the new software transmission.

9. The method of claim 1, wherein preventing creation of the new executable file further comprises intercepting an executable creation request of the new software transmission.

10. An apparatus for detecting malicious software transmission through a web portal, the apparatus comprising:
    at least one computer processor configured to:

monitor the web portal via a scan operation configured to scan software transmissions for a plurality of known malicious programs;

access a security scan history that comprises information regarding a plurality of software transmissions transmitted through the web portal and were scanned by the scan operation upon transmission;

access a current executable file creation activity that comprises information regarding a new software transmission transmitted through the web portal;

compare the current executable file creation activity with the security scan history to detect a bypass of the scan operation by the new software transmission, wherein the new software transmission had exploited a vulnerability of the web portal to bypass the scan operation upon transmission; and prevent creation of a new executable file from the new software transmission after detecting the bypass; and at least one memory, coupled to the at least one computer processor, configured to provide the at least one computer processor with instructions.

11. The apparatus of claim 10, wherein the at least one computer processor is further configured to establish an object to process notifications associated with at least one security scan and generate the security scan history.

12. A system for detecting malicious software transmission through a web portal, comprising:

one or more computer processors communicatively coupled to a network; wherein the one or more computer processors are configured to:

monitor the web portal via a scan operation configured to scan software transmissions for a plurality of known malicious programs;

access a security scan history that comprises information regarding a plurality of software transmissions transmitted through the web portal and were scanned by the scan operation upon transmission;

access a current executable file creation activity that comprises information regarding at least one new software transmission transmitted through the web portal;

compare the current executable file creation activity with the security scan history to detect a bypass of the scan operation by the new software transmission, wherein the new software transmission had exploited a vulnerability of the web portal to bypass the scan operation upon transmission; and prevent creation of a new executable file from the new software transmission after detecting the bypass.

13. The system of claim 12, wherein the one or more computer processors are further configured to establish an object to process notifications associated with at least one security scan and generates the security scan history.

14. The system of claim 12, wherein the one or more computer processors are further configured to communicate information associated with the new software transmission to a security evaluation subsystem for analysis.

15. The system of claim 14, wherein the one or more computer processors are further configured to process a computer security evaluation result that indicates at least one false positive for the new software transmission and updates safe executable information with the at least one false positive.

\* \* \* \* \*